United States Patent [19]  [11] 4,344,510

Johannesen et al.  [45] Aug. 17, 1982

[54] DISC BRAKE AND IMPROVED ADJUSTER THEREFOR

[75] Inventors: Donald D. Johannesen; Andrew F. Kazmierzak, both of South Bend, Ind.

[73] Assignee: The Bendix Corporation, Southfield, Mich.

[21] Appl. No.: 180,290

[22] Filed: Aug. 22, 1980

[51] Int. Cl.³ ............................................ F16D 65/56
[52] U.S. Cl. ................................ 188/71.9; 188/73.47; 188/196 BA; 192/70.25; 192/111 A
[58] Field of Search .............. 188/71.8, 71.9, 196 BA, 188/73.47; 192/70.25, 111 A

[56] References Cited

U.S. PATENT DOCUMENTS 3,490,562 1/1970 Press ................................. 188/71.9
3,708,041 1/1973 Hahn .
3,908,802 9/1975 Shimodaira et al. ..... 188/196 BA X
4,117,910 10/1978 Johannesen ........................ 188/71.9
4,142,611 3/1979 Johannesen ........................ 188/72.9
4,146,117 3/1979 Kawaguchi et al. ..... 188/196 BA X
4,253,550 3/1981 Kasselmann et al. ... 188/196 BA X

FOREIGN PATENT DOCUMENTS 30070 7/1864 Fed. Rep. of Germany ..... 188/71.9

Primary Examiner—George E. A. Halvosa
Attorney, Agent, or Firm—Paul David Schoenle; Ken C. Decker

[57] ABSTRACT

A disc brake assembly includes a frame (28) which is movably disposed relative to a rotor (18) and a central opening (29) on the frame carries a pair of friction elements (30, 33) facing opposite sides of the rotor. An adjuster assembly (43) is disposed within the central opening to control the position of the pair of friction elements relative to the rotor. The adjuster assembly includes a lever (44) pivotally engaging the frame and an extendible assembly (48) cooperating with the lever and frame to control the pivotal position of the lever relative to the frame. An actuator (36) extends into the central opening and is engageable with one of the friction elements and the lever. Upon operation of the actuator, the one friction element separates from the lever to engage the rotor and the frame moves to engage the other friction element with the rotor. A pawl (50) is responsive to movement of the one friction element relative to the lever to control extension of the extendible assembly. The extendible assembly is carried on the lever at an end remote from the pivotal engagement with the frame. The lever carries a roller (40) which is engageable with the actuator and a U-shaped section of the lever forms a pocket to receive the roller.

4 Claims, 3 Drawing Figures

DISC BRAKE AND IMPROVED ADJUSTER THEREFOR

The invention relates to a disc brake. The disc brake includes a frame cooperating with a pair of friction elements to dispose the latter adjacent a rotor. An actuator is operable to effect a brake application by urging the pair of friction elements into engagement with the rotor. In order to maintain the pair of friction elements closely adjacent the rotor, an adjustment apparatus cooperates with the frame and the pair of friction elements. The adjustment apparatus includes a lever pivotally engaging the frame and an extendible assembly cooperating with the lever and the frame to control the pivotal movement of the lever relative to the frame. The actuator operates between the one friction element and the lever and is expansible to force the one friction element against the rotor. Reaction forces acting through the lever and the frame force the other friction element against the rotor. A pawl is pivotally carried by the one friction element and engages a ratchet wheel of the extendible assembly. The pawl defines a cam slot which cooperates with a cam follower carried by the lever to cause pivotal movement of the pawl relative to the extendible assembly. If the running clearance of the brake is above a predetermined value, the pawl engages a successive tooth of the ratchet wheel upon a brake application and an adjustment is effected by elongating the extendible assembly.

A disc brake is known in accordance with the U.S. Pat. No. 3,708,041 to Hahn in which a frame is slidably carried by a support and disposes a pair of friction elements adjacent opposite faces of a rotor. An actuator is pivotally carried by the frame and defines a cam surface to force the one friction element against the disc. Reaction forces acting through the pivotal connection of the actuator with the frame cause the frame to slide and force the other friction element against the opposite face of the disc.

With a brake of the kind shown in the Hahn patent, a progressively increased pivotal movement of the actuator is required to apply the brake as the friction elements wear. Consequently, the operator of a vehicle equipped with such a brake experiences an ever increasing brake pedal movement between the brake released and the brake applied positions as the friction elements wear. Additionally, the mechanical advantage provided by the brake is of limited magnitude because the actuator cam must provide sufficient movement to the one friction element within the arc of motion of the actuator so that the cam can take up the slack created by wear of the friction elements and provide for the application of the brake despite this slack. Such a limited mechanical advantage is undesirable in a disc brake because the friction elements must be applied to the disc with a considerable force in order to effectively retard rotation of the disc.

The invention as claimed is intended to remedy the drawbacks of prior disc brakes by providing a disc brake in which the mechanical advantage between the actuator and friction elements is high and in which adjustment is automatically made to compensate for wear of the friction elements.

One way of carrying out the invention is described in detail below with reference to drawings which illustrate only one specific embodiment, in which.

Figure 1:
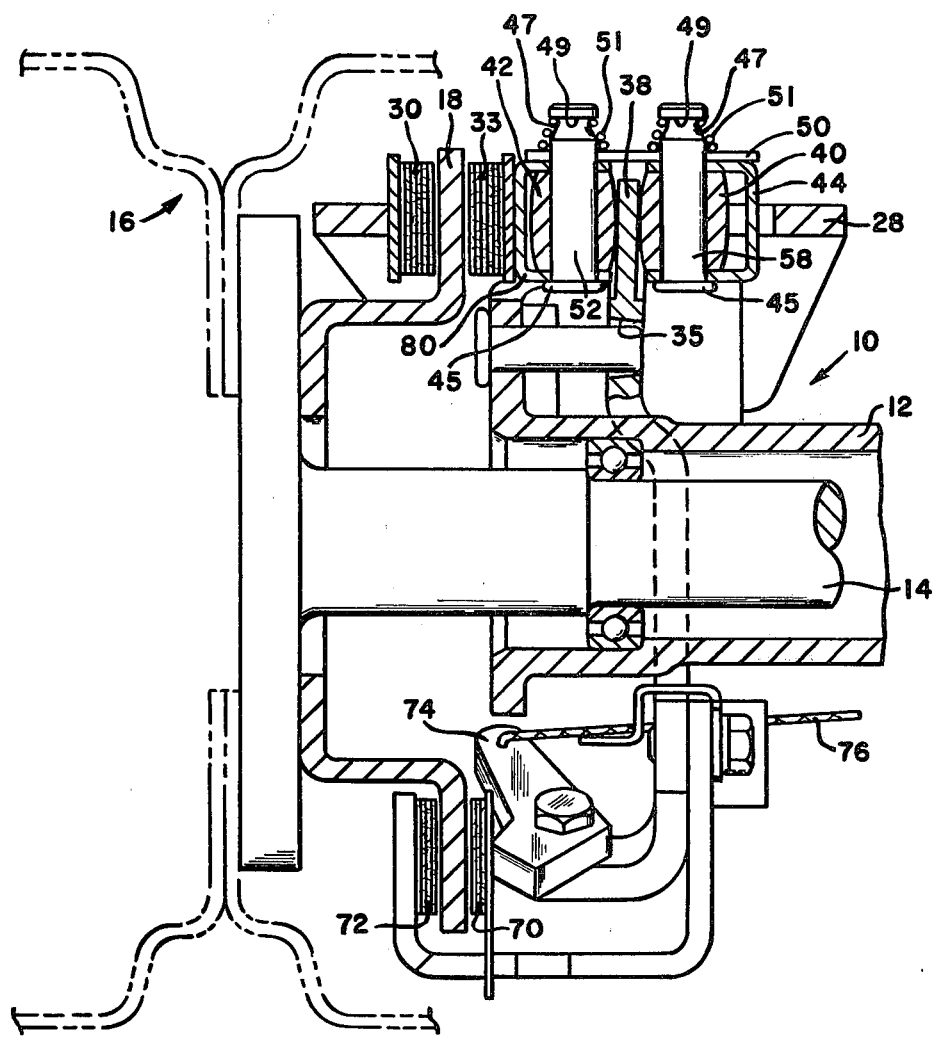
FIG. 1 is a cross-sectional view of a disc brake assembly constructed in accordance with the present invention.

In the disc brake assembly 10 shown in FIG. 1, an axle tube or support 12 rotatably receives an axle shaft 14. The shaft 14 couples to a wheel assembly 16. The shaft also carries a rotor or disc 18 such that rotation of the shaft and wheel assembly causes rotation of the rotor 18.

Figure 2:
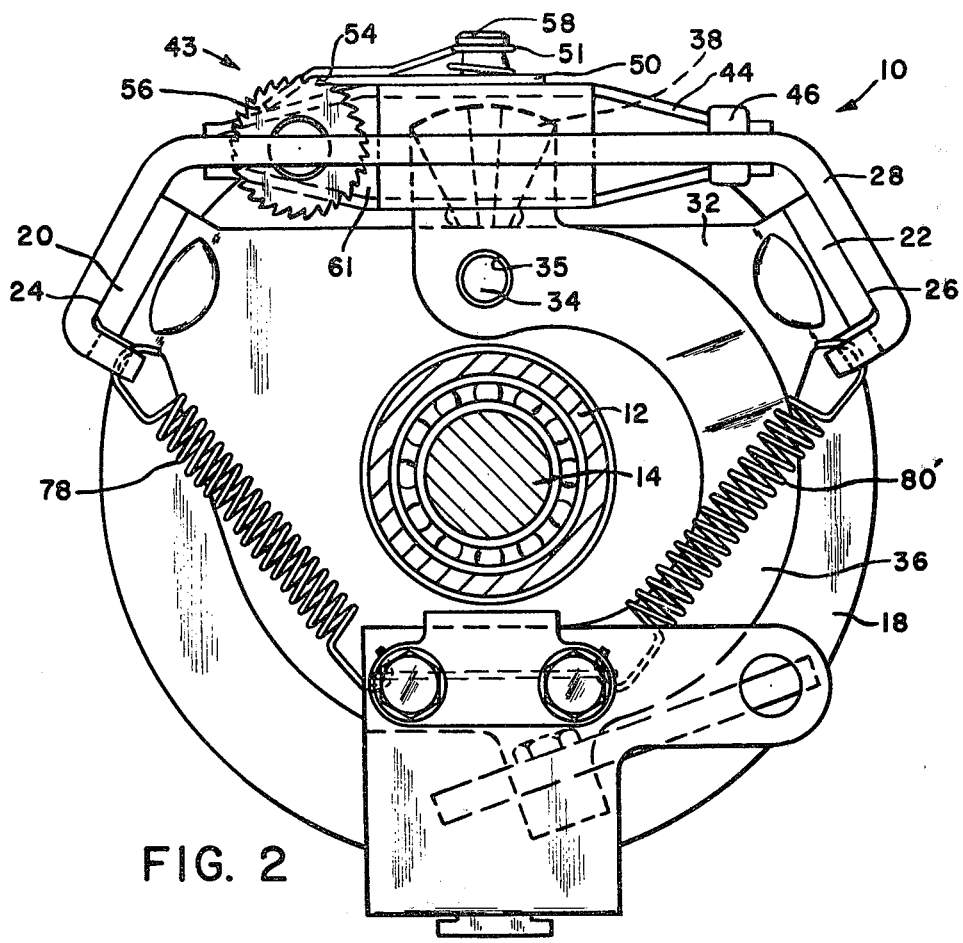
FIG. 2 is a right-side view, partly in cross-section, of the disc brake assembly shown in FIG. 1.

The support 12 defines a pair of radially extending arms 20, 22, see FIG. 2, having respective guide surfaces 24, 26. A caliper or frame 28 is slidably carried on the guide surfaces 24, 26 and the frame movably carries a pair of friction elements 30, 33 which are disposed on opposite sides of the rotor 18. The pair of friction elements are disposed within a central opening 29 having edges 31.

A flange 32 extends from the support 12 between the pair of arms 20, 22 and a pin 34 is mounted on the flange. An actuator 36 is pivotally supported on the pin 34 at a tapered opening 35 in the actuator. The actuator 36 terminates at one end in a cam member 38. The cam member is engageable with a pair of rollers 40, 42 such that movement away from a neutral position causes the rollers to separate. The roller 42 moves away from the roller 40 to urge the friction element 33 into engagement with the rotor 18 whereupon reaction forces acting on the frame 28 cause the latter to slide on the guide surfaces 24, 26 to engage the friction element 30 with the rotor 18.

An adjustment assembly 43 is carried within the central opening 29 to oppose the cam member 38. The adjustment assembly comprises an adjusting lever 44, an extendible assembly 48 and a pawl lever 50. The extendible assembly 48 is offset relative to the actuator within the central opening 29 so that the rollers 40 and 42 and the extendible assembly 48 will compactly fit within the central opening 29. The adjusting lever 44 is pivoted to the frame 28 via pin 46. The adjusting lever carries the extendible assembly 48 at its end opposite the pin 46 and the extendible assembly is engageable with the pawl lever 50. The pawl lever is pivotally mounted on the friction element 33 via pin 52 and is provided with an edge 54 which is engageable with a ratchet wheel 56 of the extendible assembly. Pawl lever 50 defines a cam slot 53 in which is received a pin 58 projecting from the top of lever 44. As is illustrated in FIG. 1, the rollers 40, 42 are journaled for rotation on pins 58, 52 respectively. Pins 52, 58 are substantially identical and include a head 45 and a groove 47 which define a shoulder 49. Pawl lever 50 is received over the free ends of pins 52, 58 opposite the heads 45. A conical compression spring 51 is received on the free end of pin 58 and its upper end is received in groove 47. The shoulder 49 retains spring 51 on pin 58 and prevents its upward movement. A torsion spring 57 extends from the lever 44 around the pin 52 to the pawl lever 50 and serves to bias the latter clockwise against pin 58 viewing FIG. 3. Spring 57 is also a conical compression spring and is received on the free end of pin 52, as explained with regard to spring 51. Both springs 51 and 57 bear on the top surface of pawl lever 50 and bias it into driving engagement with the ratchet wheel 56. The adjusting lever 44 is substantially U-shaped in cross section so as to define a pocket for receiving the roller 40.

Figure 3:
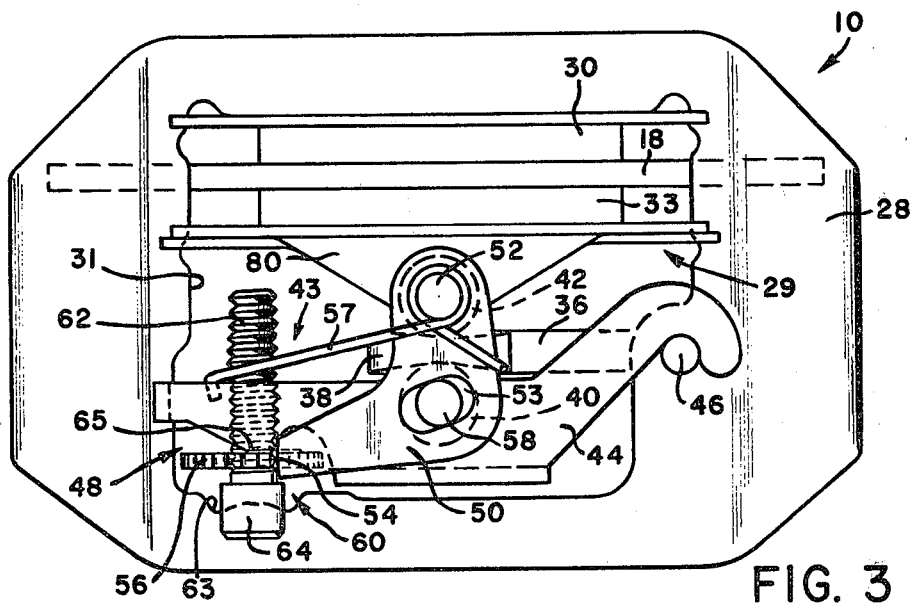
FIG. 3 is a partial top view of FIG. 2.

Turning now to FIG. 3, the extendible assembly 48 includes a bolt 60 received in an aperture 61 defined in the left end of lever 44. The bolt 60 includes a threaded stem 62 and the ratchet wheel 56 is threadably secured thereto. An enlarged head 64 of bolt 60 forms a slot to receive a portion of the frame 28 and a notch 63 in the frame receives head 64. The ratchet wheel bears against a pair of abutments 65 defined by the lever 44.

In order to pivot the actuator 36 about pin 34, a pair of friction pads 70, 72 are carried at the end of actuator 36 remote from cam member 38. An input lever 74 is pivotally secured to the remote end of the actuator 36 such that movement of the input lever by a cable 76 causes the friction pads 70 and 72 to frictionally engage the rotor 18 at a location substantially opposite the pair of friction elements 30 and 33. When the friction pads 70 and 72 contact the rotor 18, the rotation of the rotor causes the actuator 36 to rotate with the rotor so as to pivot about pin 34.

Upon inspection of FIG. 2, it will be seen that the actuator 36 is arcuate in order to extend around the periphery of the axle tube 12. Moreover, there is sufficient clearance between the tube 12 and the actuator 36 to permit rotation of the latter in a clockwise direction. The actuator is biased to a neutral position by a pair of springs 78 and 80' extending from the remote end of the actuator to the frame 28.

When the disc brake assembly is operated, the cable 76 is pulled by a vehicle operator so that the lever 74 biases the friction pad 70 into engagement with the rotor 18. The tapered opening 35 which receives the pin 34 permits a slight amount of axial tilting for the actuator 36 so that the lever 74 causes the actuator to engage the friction pad 72 with the rotor. With both pads frictionally engaging the rotor, the actuator is rotated about pin 34 in the direction of the rotating rotor. The cam member 38 also pivots with the actuator to spread the rollers 40 and 42 apart. Consequently, the friction element 33 is directly moved into engagement with the rotor while friction element 30 is moved into engagement with the rotor by the reaction of the frame 28 to move to the right in FIG. 1. Although the friction pads 70 and 72 retard the rotation of the rotor when in engagement therewith, it is the friction elements 30 and 33 which provide the majority of braking for the rotor 18.

Referring now to FIG. 3, when the brake is applied, the friction element 33 moves upward, viewing FIG. 3, relative to frame 28 and lever 44. The movement of friction element 33 away from lever 44 causes the pawl lever 50 to be pivoted counter-clockwise about pin 52 because of the engagement of pin 58 in cam slot 53. Consequently, the edge 54 on the pawl lever 50 is movable to impart rotation to the ratchet wheel 56 and sleeve 60. After successive brake applications, the friction linings of the friction elements will wear so that further rotation of the actuator and increased movement of the friction element 33 will be necessary to effectuate braking of the rotor 18. This increased movement of the friction element 33 causes the pawl edge 54 to index to successive teeth on the ratchet wheel 56 and to rotate the ratchet wheel and sleeve 60 under the force of spring 57. When the ratchet wheel 56 rotates, it is moved away from the head 64 of threaded stem 62 to pivot lever 44 toward the rotor 18. As a result, the roller 40 opposes the cam member 38 to adjust the position of the frame 28 relative to the guide surfaces 24 and 26. Moreover, the friction elements 30 and 33 are moved closer to the rotor 18 to take up the lining wear for the elements.

As illustrated in FIG. 3, the roller 42 may be caged in a plate 80 which is separate from but in contact with the friction element 33. It is also possible to cage the roller 42 in a plate which forms the backing plate for the friction element 33.

We claim:

1. In a disc brake assembly comprising a frame formed of a continuous, movable plate member having a closed loop with a central opening receiving a pair of friction elements therein adjacent a rotor, an actuator operable during a brake application to urge the pair of friction elements into engagement with the rotor, an adjustment means cooperating with the frame and the pair of friction elements to maintain a running clearance between the rotor and the pair of friction elements, said adjustment means including a lever extending into the central opening and pivotally engaging said frame and including an extendible assembly cooperating with said lever and frame to control the pivotal movement of said lever, characterized in that a pawl is pivotally engaged with one of said pair of friction elements, said pawl engaging the lever and the extendible assembly so as to impart movement to said extendible assembly in response to movement of said one friction element, and said pawl being carried by said one friction element and said lever to substantially remain within the central opening in spaced relation to said frame.

2. In a disc brake:
a support;
a rotor rotatable about an axis and having a pair of friction faces on opposite sides thereof;
a frame formed of a continuous, movable plate member having a closed loop with a central opening carried by said support and being axially movable relative to said rotor, said central opening receiving a portion of said rotor and a pair of friction elements disposed adjacent the friction faces of said rotor, one of said friction elements being axially movable relative to said frame to engage said rotor, the other of said friction elements being carried by said frame and engageable with said rotor by axial movement of said frame relative to said rotor;
a first lever pivotally carried within said central opening;
an extendible assembly disposed within said central opening and between the first lever and said frame to adjustably pivot said lever relative to said frame;
means engaging said one friction element and said lever for effectuating a brake application by forcing said one element toward said rotor and forcing said lever away from said rotor, whereby said other friction element is forced into engagement with said rotor; and
a second lever pivotally carried within said central opening by said one friction element and engageable with said first lever and said extendible assembly to effect an elongation thereof responsive to movement of said one friction element relative to said first lever, said second lever defining a cam slot for receiving a portion of said first lever, said one friction element being movable in one direction during the brake application and said first lever portion being movable in a second direction substantially opposite to the one direction during the brake application and said first lever portion cooperating with said second lever cam slot to pivot said second lever relative to said one friction element during the brake application.

3. A disc brake of the type including:

a rotor rotatable about an axis and having a pair of friction faces on opposite sides thereof;

a frame formed of a continuous, movable plate member having a closed loop with a central opening receiving a portion of said rotor and a pair of friction elements movably disposed therein adjacent said pair of friction faces;

a non-rotatable support carrying said frame for axial movement relative to said rotor;

a first lever received in said central opening, said first lever being pivotally connected at one end thereof to said frame and being adjacent to one of said friction elements;

an adjustable member disposed within said central opening extending between the other end of said first lever and said frame, said adjustable member including a ratchet wheel, rotation of which varies the length of said adjustable member and the pivotal position of said first lever in said central opening;

an actuator received between said first lever and the one friction element, said actuator being engageable with a portion of said one friction element and a portion of said first lever, said actuator being expansible to separate said first lever and said one firction element so that said one friction element is forced against a friction face of said rotor, said frame sliding axially to force the other of said friction elements against the other friction face of said rotor;

the improvement comprising a second lever pivotally carried within said central opening by said one friction element portion and defining a pawl drivingly engageable with said ratchet wheel, said second lever and said first lever portion having cooperating means for pivoting said second lever responsive to relative movement between said one friction element and said first lever, whereby said adjustable member is lengthened responsive to relative movement between said first lever and said one friction element if said relative movement exceeds a predetermined value.

4. The disc brake of claim 3 in which said one friction element includes a first roller assembly engageable with said actuator and said first lever includes a second roller assembly engageable with said actuator and said second lever is engageable with both said roller assemblies.

* * * * *